United States Patent
Kim et al.

(10) Patent No.: US 12,408,217 B2
(45) Date of Patent: Sep. 2, 2025

(54) P2P TRANSMISSION METHOD

(71) Applicant: LG ELECTRONICS INC., Seoul (KR)

(72) Inventors: Sanggook Kim, Seoul (KR); Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 409 days.

(21) Appl. No.: 17/921,057

(22) PCT Filed: Apr. 16, 2021

(86) PCT No.: PCT/KR2021/004819
§ 371 (c)(1),
(2) Date: Oct. 24, 2022

(87) PCT Pub. No.: WO2021/215753
PCT Pub. Date: Oct. 28, 2021

(65) Prior Publication Data
US 2023/0180314 A1 Jun. 8, 2023

Related U.S. Application Data

(60) Provisional application No. 63/038,135, filed on Jun. 12, 2020, provisional application No. 63/014,136, filed on Apr. 23, 2020.

(51) Int. Cl.
*H04W 76/14* (2018.01)
*H04L 1/00* (2006.01)
(Continued)

(52) U.S. Cl.
CPC ........... *H04W 76/14* (2018.02); *H04L 1/0003* (2013.01); *H04W 76/30* (2018.02); *H04W 84/12* (2013.01)

(58) Field of Classification Search
CPC ..... H04W 76/14; H04W 76/30; H04W 84/12; H04W 72/04; H04W 72/12; H04L 1/0003;
(Continued)

(56) References Cited

U.S. PATENT DOCUMENTS

2011/0216739 A1* 9/2011 Lee ................. H04W 72/04 370/329
2016/0204960 A1* 7/2016 Yu ................... H04B 7/0417 370/338
(Continued)

FOREIGN PATENT DOCUMENTS

WO 2017069589 4/2017

OTHER PUBLICATIONS

Canon, "Direct Link MU transmissions", doc.: IEEE 802.11-19/1117r2, Sep. 2019, 13 pages.
(Continued)

*Primary Examiner* — Afshawn M Towfighi
(74) *Attorney, Agent, or Firm* — LEE, HONG, DEGERMAN, KANG & WAIMEY

(57) ABSTRACT

A transmitting STA can directly communicate with a receiving STA in a wireless local area network (wireless LAN) system. The transmitting STA can transmit, to an AP, a request signal for a P2P transmission at a determined time or a random time and, when a trigger frame is received from the AP, the transmitting STA can perform P2P communication with a receiving STA on the basis of the trigger frame.

4 Claims, 14 Drawing Sheets

(a)

(b)

(51) Int. Cl.
*H04W 76/30* (2018.01)
*H04W 84/12* (2009.01)

(58) Field of Classification Search
CPC ... H04L 1/0001; H04L 1/1854; H04L 1/0026; H04L 1/0009
See application file for complete search history.

(56) References Cited

U.S. PATENT DOCUMENTS

2018/0205442 A1* 7/2018 Oteri ................ H04B 7/0632
2018/0317128 A1* 11/2018 Chun ................ H04L 5/0055

OTHER PUBLICATIONS

Canon, "Triggered P2P Transmissions", doc.: IEEE 802.11-20/0095r1, Mar. 2020, 11 pages.
PCT International Application No. PCT/KR2021/004819, Written Opinion of the International Search Report dated Jul. 23, 2021, 4 pages.

* cited by examiner (a)

(b)

P2P TRANSMISSION METHOD

CROSS-REFERENCE TO RELATED APPLICATIONS

This application is the National Stage filing under 35 U.S.C. 371 of International Application No. PCT/KR2021/004819, filed on Apr. 16, 2021, and claims the benefit of U.S. Provisional Application No. 63/014,136, filed on Apr. 23, 2020, and 63/038,135, filed on Jun. 12, 2020, the contents of which are all incorporated by reference herein in their entireties.

TECHNICAL FIELD

The present specification relates to a method for peer-to-peer (P2P) transmission in a wireless local area network (WLAN) system.

BACKGROUND

Wireless network technologies may include various types of wireless local area networks (WLANs). The WLAN employs widely used networking protocols and can be used to interconnect nearby devices together. The various technical features described herein may be applied to any communication standard, such as WiFi or, more generally, any one of the IEEE 802.11 family of wireless protocols. A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

A transmitting STA of a wireless local area network (WLAN) system according to various embodiments may transmit a peer-to-peer (P2P) request signal to an access point (AP). A transmitting STA may transmit, to the AP, a P2P request signal. A transmitting STA may receive, from the AP, a P2P trigger frame. A transmitting STA may transmit, to a receiving STA, a null data packet announcement (NDPA) and a null data packet (NDP) frame. A transmitting STA may receive, from the receiving STA channel information between the transmitting STA and the receiving STA. A transmitting STA may determine a modulation and coding scheme (MCS) and a number of space-time-stream (NSTS) based on the channel information. A transmitting STA may transmit, to the receiving STA, a physical protocol data unit (PPDU) based on the MCS and the NSTS.

According to an example of the present specification, P2P communication can be performed even in WLAN, and even lower delay and throughput improvement can be expected by performing direct data transmission/reception between terminals through P2P communication.

DETAILED DESCRIPTION

Figure 1:
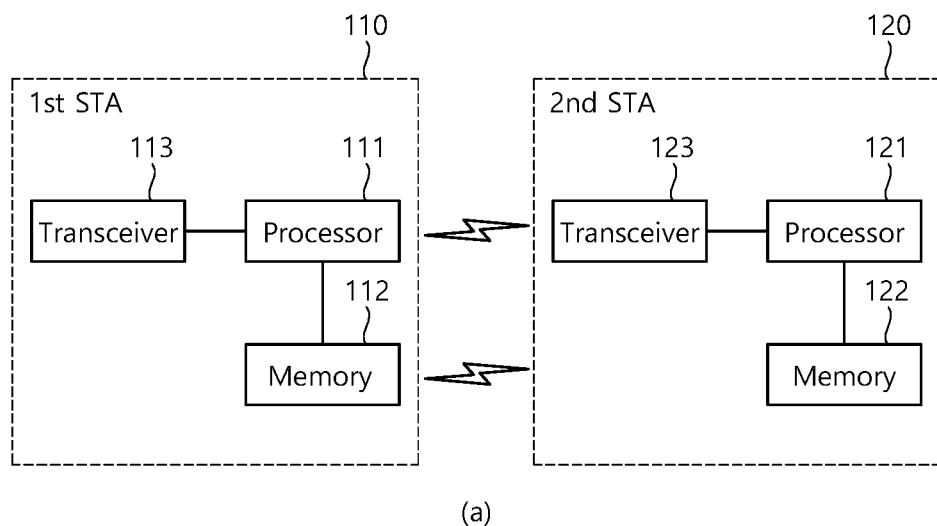
FIG. 1 shows an example of a transmitting apparatus and/or receiving apparatus of the present specification.
Figure 1:
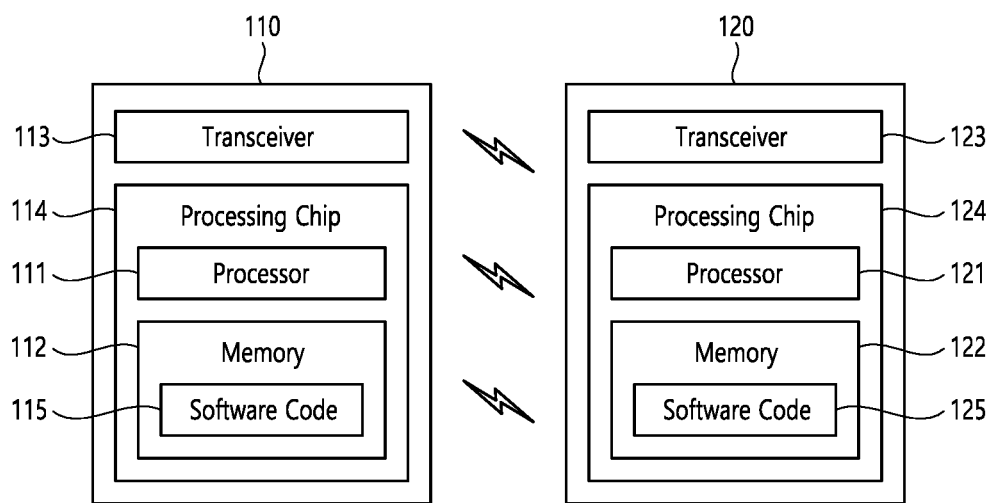

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
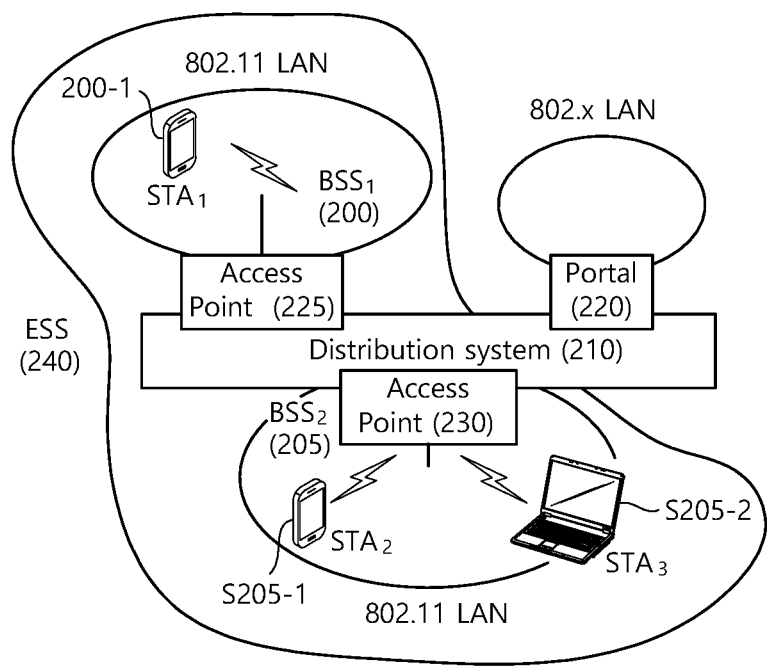
FIG. 2 is a conceptual view illustrating the structure of a wireless local area network (WLAN).
Figure 2:
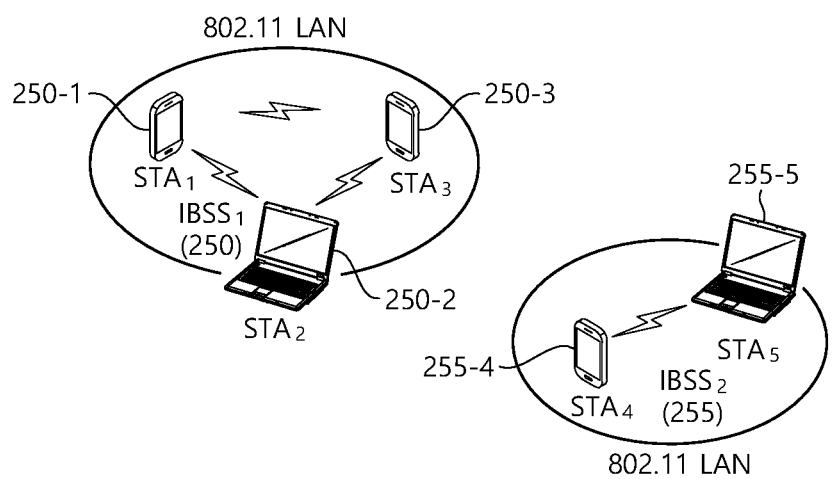

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and

205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
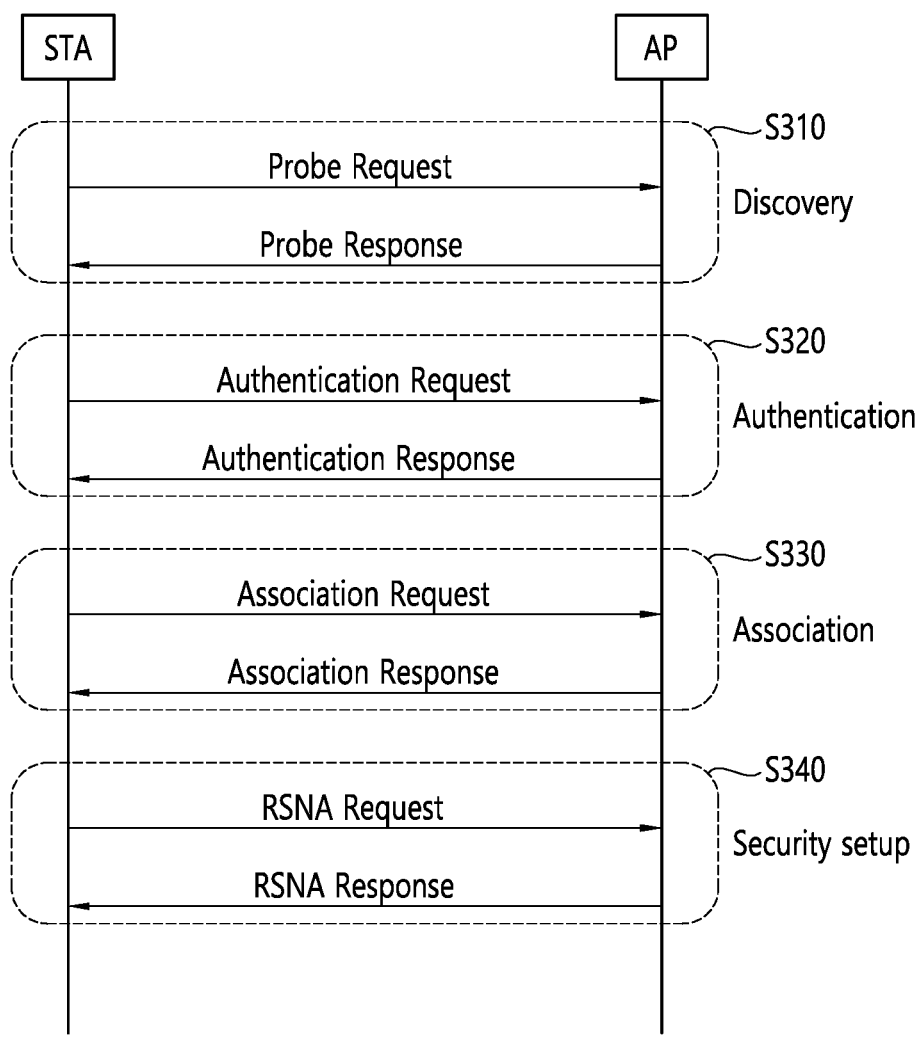
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
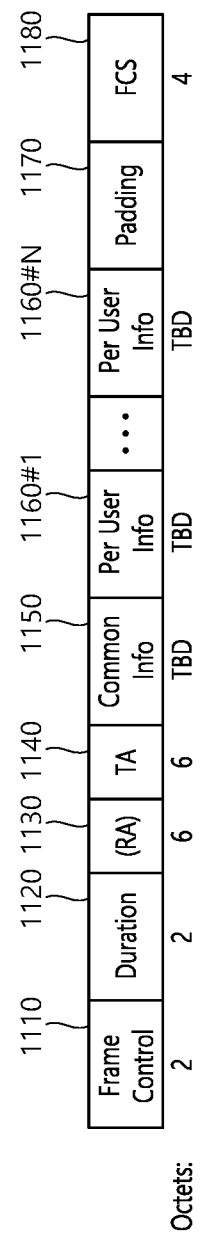
FIG. 4 illustrates an example of a trigger frame.

FIG. 4 illustrates an example of a trigger frame. The trigger frame of FIG. 4 allocates a resource for uplink multiple-user (MU) transmission, and may be transmitted, for example, from an AP. The trigger frame may be configured of a MAC frame, and may be included in a PPDU.

Each field shown in FIG. 4 may be partially omitted, and another field may be added. In addition, a length of each field may be changed to be different from that shown in the figure.

A frame control field 1110 of FIG. 4 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 4 are preferably included. The per user information field may also be called an "allocation field".

In addition, the trigger frame of FIG. 4 may include a padding field 1170 and a frame check sequence field 1180.

Each of the per user information fields 1160 #1 to 1160 #N shown in FIG. 4 may include a plurality of subfields.

Hereinafter, a PPDU transmitted/received in a STA of the present specification will be described.

Figure 5:
FIG. 5 illustrates an example of a PPDU used in the present specification.

FIG. 5 illustrates an example of a PPDU used in the present specification.

The PPDU of FIG. 5 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 5 may indicate the entirety or part of a PPDU type used in the EHT system. For example, the example of FIG. 5 may be used for both of a single-user (SU) mode and a multi-user (MU) mode. In other words, the PPDU of FIG. 5 may be a PPDU for one receiving STA or a plurality of receiving STAs. When the PPDU of FIG. 5 is used for a trigger-based (TB) mode, the EHT-SIG of FIG. 5 may be omitted. In other words, a STA which has received a trigger frame for uplink-MU (UL-MU) may transmit the PPDU in which the EHT-SIG is omitted in the example of FIG. 5.

In FIG. 5, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 5 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 5. The PPDU of FIG. 5 may be used to transmit/receive frames of various types. For example, the PPDU of FIG. 5 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 5 may be used for a management frame. An example of the management frame may include a beacon frame, a (re-)association request frame, a (re-)association response frame, a probe request frame, and a probe response frame. For example, the PPDU of FIG. 5 may be used for a data frame. For example, the PPDU of FIG. 5 may be used to simultaneously transmit at least two or more of the control frame, the management frame, and the data frame.

Figure 6:
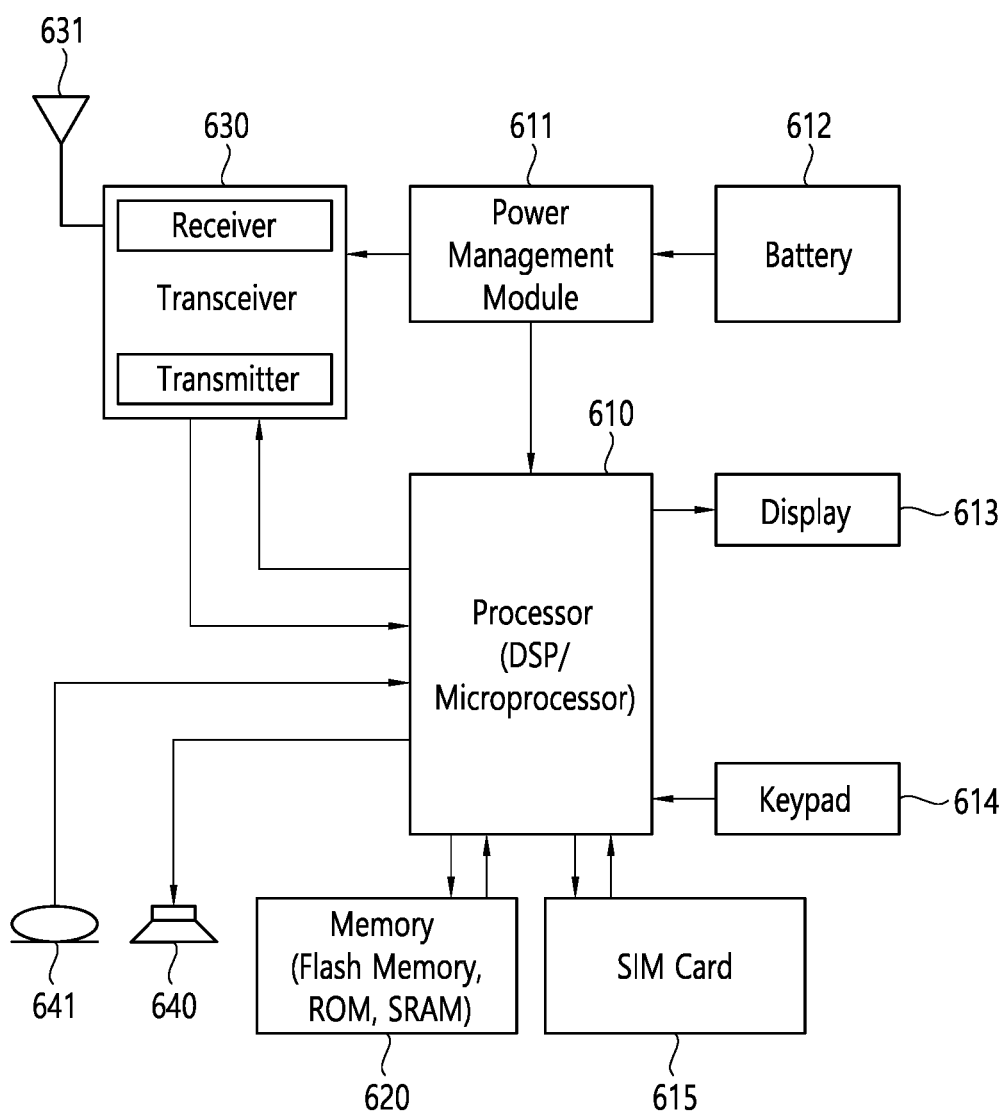
FIG. 6 shows a modified example of a transmitting apparatus and/or a receiving apparatus of the present specification.

FIG. 6 shows a modified example of a transmitting apparatus and/or a receiving apparatus of the present specification.

Each device/STA of the sub-drawings (a)/(b) of FIG. 1 could be modified as shown in FIG. 6. The transceiver 630 of FIG. 6 may be the same as the transceivers 113 and 123 of FIG. 1. The transceiver 630 of FIG. 6 may include a receiver and a transmitter.

The processor 610 of FIG. 6 may be the same as the processors 111 and 121 of FIG. 1. Alternatively, the processor 610 of FIG. 6 may be the same as the processing chips 114 and 124 of FIG. 1.

The memory 150 of FIG. 6 may be the same as the memories 112 and 122 of FIG. 1. Alternatively, the memory 150 of FIG. 6 may be a separate external memory different from the memories 112 and 122 of FIG. 1.

Referring to FIG. 6, the power management module 611 manages power for the processor 610 and/or the transceiver 630. The battery 612 supplies power to the power management module 611. The display 613 outputs the result processed by the processor 610. Keypad 614 receives input to be used by processor 610. A keypad 614 may be displayed on the display 613. The SIM card 615 may be an integrated circuit used to securely store an international mobile subscriber identity (IMSI) and its associated keys used to identify and authenticate subscribers in mobile phone devices, such as mobile phones and computers.

Referring to FIG. 6, the speaker 640 may output a sound related result processed by the processor 610. Microphone 641 may receive sound related input to be used by processor 610.

Peer-to-Peer (P2P) communication may have advantages of low delay due to one-hop transmission and high throughput due to a small number of transmissions.

P2P transmission has been adopted in other standards such as 3GPP, but its distributed control nature has delayed its adoption in Wireless Local Area Network (WLAN).

In the present specification, a method for supporting P2P communication in a wireless local area network (WLAN) environment, in particular, an IEEE 802.11 system is proposed.

Figure 7:
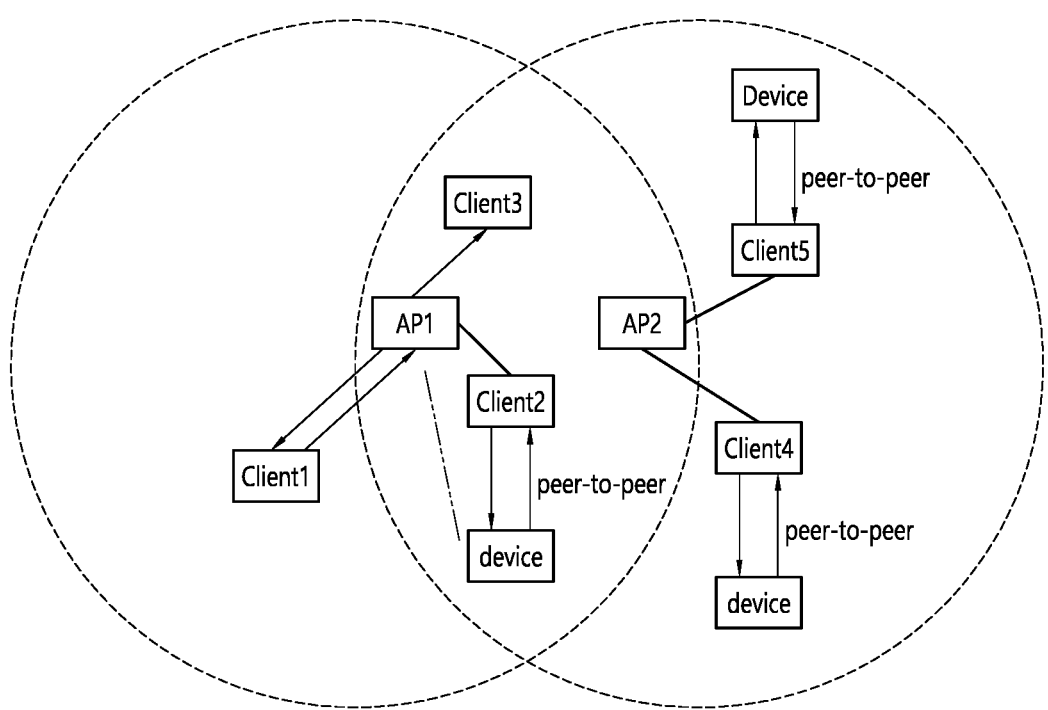
FIG. 7 is a diagram illustrating a communication network according to an example of the present specification.

FIG. 7 is a diagram illustrating a communication network according to an example of the present specification.

Referring to FIG. 7, a client and a device may directly perform P2P communication. Client 2 and Client 4 may be initiators of P2P transmission, and devices may be responders of P2P transmission. The initiator and the device may belong to the same basic service set (BSS), or may belong to different BSSs. Although P2P communication between terminals can be performed, P2P transmission can also be managed by the AP.

Figure 8:
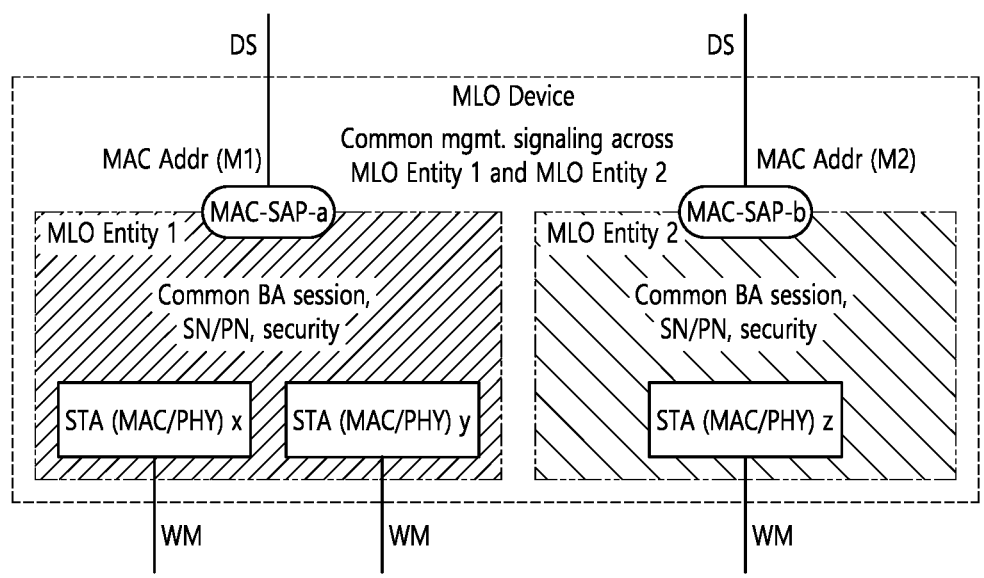
FIG. 8 is a diagram illustrating an example of a multi-link device (MLD) structure.

FIG. 8 is a diagram illustrating an example of a multi-link device (MLD) structure.

Referring to FIG. 8, one STA (MAC/PHY instance) may exist per link. Each STA may have its own MAC/PHY attributes/capabilities for each link. The MAC address of each STA may be the same or different.

A multi-link operation (MLO) entity may be a collection of STAs. An MLO-entity may have an externally addressable unique MAC address that is a MAC-SAP endpoint. All STAs in the MLO entity may have the same BA session, security, and SN/PN.

A multi-link device (MLD) may be a collection of MLO-Entities. An MLD can have multiple MAC-SAP endpoints in DS. For power-saving, common management signaling is available to all MLO-Entities.

Hereinafter, a P2P transmission method will be described.

The non-AP MLD may transmit capability information related to whether P2P is supported when (re-)associated with the AP MLD.

A new capability element (ie, P2P communication capability) may be included in the Association request frame.

The P2P capability information may include link and channel information that can be used for P2P transmission. For example, non-AP MLD may designate 5 GHz and/or 6 GHz as specific channel numbers for possible P2P transmission. In addition, a non-AP MLD may specify the maximum number of links and channels to be aggregated for P2P transmission.

1. A Method for AP-Initiated P2P Transmission
How to Share P2P Intent Between an AP MLD and a Non-AP MLD:
Negotiation Phase:

A. AP MLD may broadcast time information for non-AP MLD to transmit a P2P request indicating the intention of P2P transmission to AP MLD. For example, the time information may include periodicity, duration, link, and/or channel information to which the information is to be allocated.

B. A non-AP MLD P2P STA(s) with data for P2P transmission may transmit a request signal during the time interval specified in A. The request signal includes its own source address, target P2P non-AP MLD information (for example, MLD level MAC address, etc.), buffer status (for example, buffer status report (BSR)), location information, channel state availability information, and the like may be included. The location information may be used by the AP MLD to schedule one or more P2P transmission pairs. The channel availability information may indicate whether a channel between the P2P initiating non-AP MLD STA and the target P2P Non-AP MLD STA is available.

C. The AP MLD may transmit an ACK for the request signal. The ACK may be a Normal or an MU-ACK.

Figure 9:
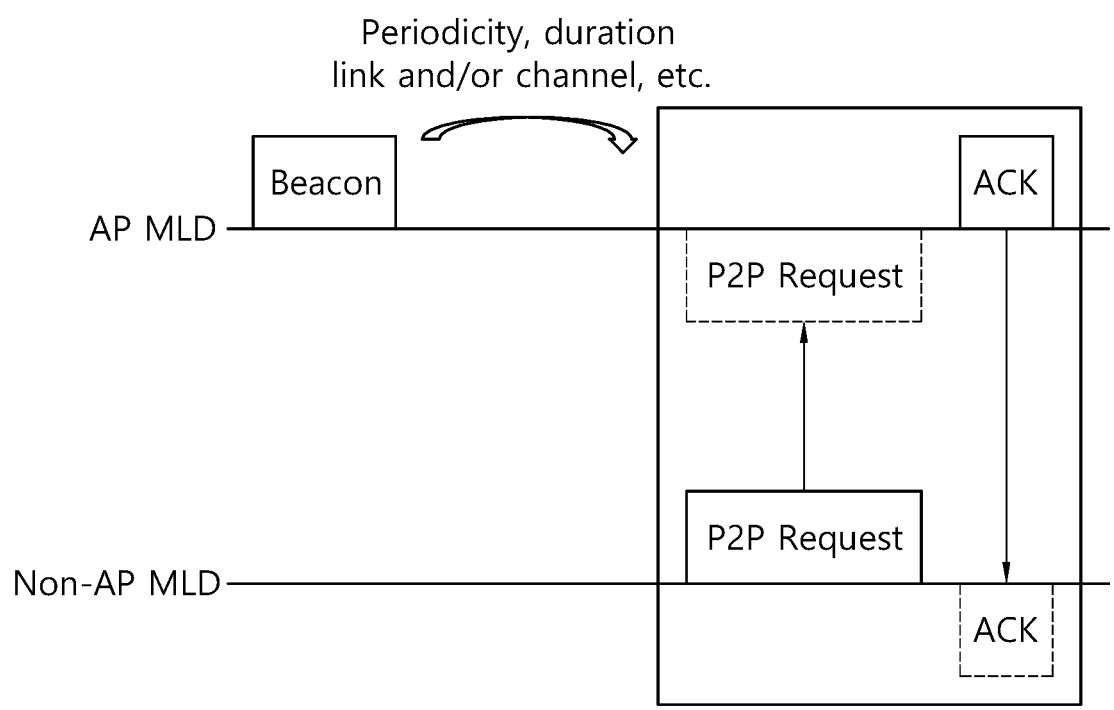
FIG. 9 is a diagram illustrating an embodiment of a P2P transmission method initiated by an AP.

FIG. 9 is a diagram illustrating an embodiment of a P2P transmission method initiated by an AP.

Referring to FIG. 9, the AP MLD may transmit a Beacon frame to the non-AP MLD. Time information for the non-AP MLD to transmit a P2P transmission request signal (ie, P2P request) to the AP MLD (for example, Periodicity, duration, link and/or channel, etc.) may be included in the Beacon frame.

The non-AP MLD may receive a beacon and may transmit a P2P Request frame to the AP MLD based on information included in the beacon. The AP MLD may receive a P2P request frame from the non-AP MLD and may transmit an ACK. Although only one non-AP MLD is shown in FIG. 9, a plurality of P2P requests may be transmitted during the P2P request period. In this case, the ACK may be transmitted as an MU-ACK.

P2P Transmission Steps:
Case 1-1: When the P2P Transmission Initiator Knows the Channel Between the P2P Transmission Initiator and the P2P Responder A. The AP MLD may transmit a trigger frame including information for P2P transmission. For example, the trigger frame may be transmitted using the SU/MU PPDU. P2P transmission may be performed in UL/DL orthogonal frequency division multiple access (OFDMA). For P2P transmission, the AP MLD may allocate all or part of a transmission opportunity (TXOP). The trigger frame may be a modification of the existing frame (for example, information or a field for P2P transmission is included in the existing trigger frame) or may be newly defined. For example, a trigger frame type for P2P transmission may be newly defined.

P2P transmission may entirely use the TXOP obtained by the AP, or may share the TXOP with general transmission (ie, transmission between the STA and the AP). When the AP transmits TXOP-related information to an STA (for example, a source STA that is a P2P initiator), information related to whether to use TXOP only for P2P transmission or whether to use TXOP for both P2P transmission and general transmission may be transmitted. For example, information related to TXOP may transmit an indicator related to whether the TXOP is for P2P transmission only or whether the TXOP is for both general transmission and P2P transmission. For example, the indicator may include information that if it has a value of 0, TXOP is for P2P transmission only, and if it has a value of 1, TXOP is for both P2P transmission and general transmission as 1-bit information.

When TXOP is used for both P2P transmission and normal transmission, P2P transmission may be performed within the TXOP before normal transmission, between normal transmissions, or after the normal transmission ends. The P2P transmission in the TXOP may be performed after the P2P start frame indicating the start of P2P transmission by the P2P transmitting STA (ie, the P2P initiator STA). The P2P start frame may be a newly defined frame, or an existing frame (for example, NDPA, MU-RTS, etc.) may be used as the P2P start frame. The P2P initiation frame may be transmitted by the AP (or STA), and after the P2P initiation frame exchange (for example, after receiving an ACK for the P2P initiation frame), P2P transmission between the STAs may be performed.

For example, the trigger frame may be transmitted at the beginning of the TXOP acquired by the AP MLD, or may be transmitted after the normal traffic exchange is completed during the TXOP. When the trigger frame is transmitted at the start point of the TXOP acquired by the AP MLD, the TXOP may be allocated to P2P traffic, or the remaining TXOP may be used for general traffic exchange after the P2P traffic exchange is completed.

B. In the TXOP acquired by the AP, if the trigger frame is transmitted after the completion of the general traffic exchange, the remaining TXOP duration may be used for P2P traffic exchange.

C. Thereafter, P2P transmission may be performed between the P2P non-AP MLD STA pairs.

D. When the P2P transmission terminates earlier than the predetermined period, the source P2P device (ie, the P2P initiator) may transmit, to the AP MLD a release message indicating that the P2P transmission is terminated.

Figure 10:
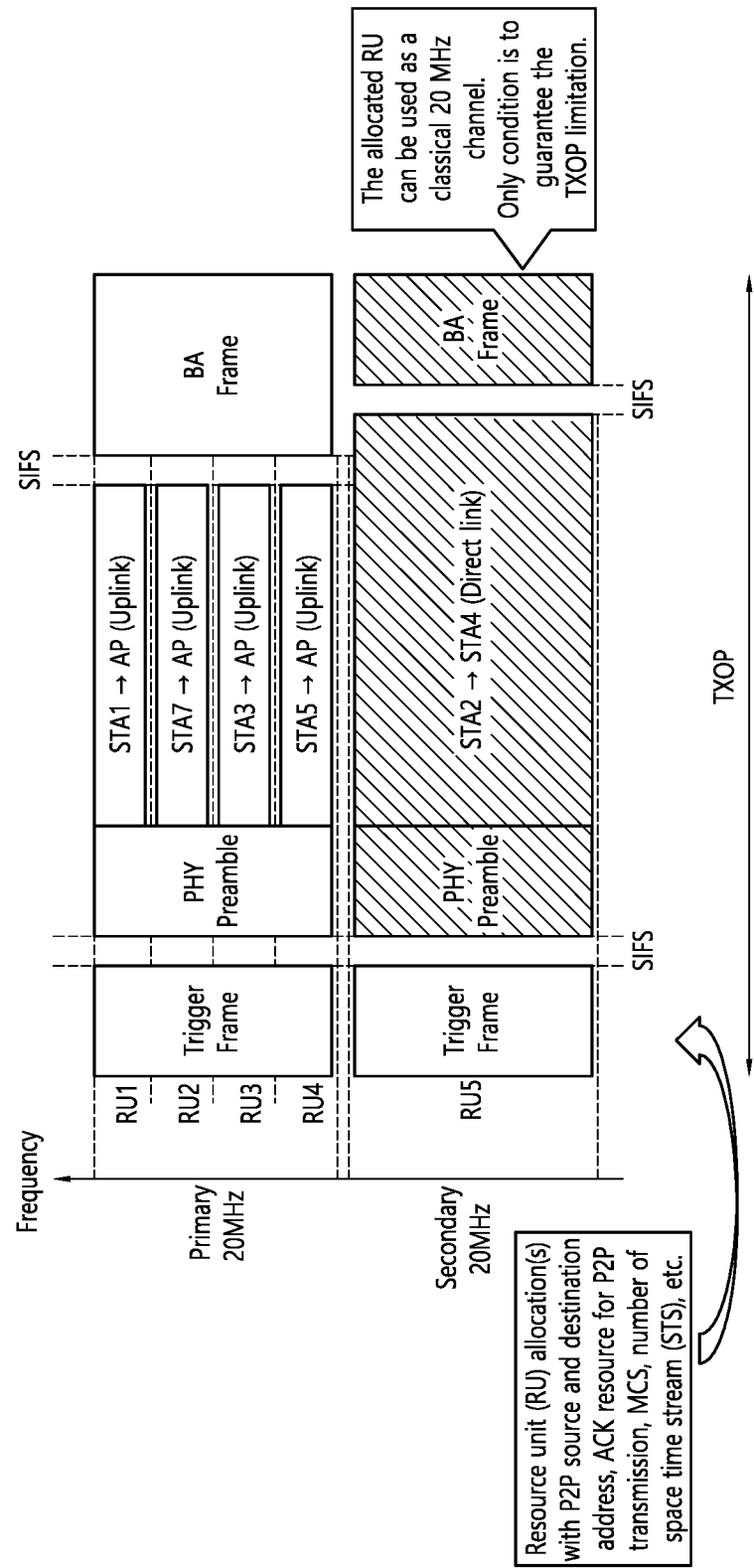
FIG. 10 is a diagram illustrating an embodiment of a resource allocation method for P2P transmission.

FIG. 10 is a diagram illustrating an embodiment of a resource allocation method for P2P transmission.

Referring to FIG. 10, a resource for P2P transmission may be allocated to a secondary channel. For example, when the transmission channel is 40 MHz, the primary 20 MHz channel may be allocated for general UL-MU OFDMA transmission. For example, the secondary 20 MHz channel may be allocated for STA2, which is a P2P initiator, and STA4, which is a P2P responder, for P2P transmission. A resource for BA frame transmission may be allocated to a secondary 20 MHz channel in the same way.

Case 1-2: when the P2P Transmission Initiator does not Know the Channel Between the P2P Transmission Initiator and the P2P Responder A. AP MLD may perform P2P transmission scheduling. Scheduling information for P2P transmission may include the link and/or channel, duration information, and the like.

B. The scheduling information may be included in a trigger frame. The AP MLD may transmit a trigger frame including information for P2P transmission. For example, the trigger frame may be transmitted using the SU/MU PPDU. P2P transmission may be performed in UL/DL orthogonal frequency division multiple access (OFDMA). The trigger frame may be a modification of the existing frame (for example, information or a field for P2P transmission is included in the existing trigger frame) or may be newly defined. For example, a trigger frame type for P2P transmission may be newly defined.

P2P transmission may entirely use the TXOP obtained by the AP, or may share the TXOP with general transmission (ie, transmission between the STA and the AP). When the AP transmits TXOP-related information to an STA (for example, a source STA that is a P2P initiator), information related to whether to use TXOP only for P2P transmission or whether to use TXOP for both P2P transmission and general transmission may be transmitted. For example, information related to TXOP may transmit an indicator related to whether the TXOP is for P2P transmission only or whether the TXOP is for both general transmission and P2P transmission. For example, the indicator may include information that if it has a value of 0, TXOP is for P2P transmission only, and if it has a value of 1, TXOP is for both P2P transmission and general transmission as 1-bit information.

When TXOP is used for both P2P transmission and normal transmission, P2P transmission may be performed within the TXOP before normal transmission, between normal transmissions, or after the normal transmission ends. The P2P transmission in the TXOP may be performed after the P2P start frame indicating the start of P2P transmission by the P2P transmitting STA (ie, the P2P initiator STA). The P2P start frame may be a newly defined frame, or an existing frame (for example, NDPA, MU-RTS, etc.) may be used as the P2P start frame. The P2P initiation frame may be transmitted by the AP (or STA), and after the P2P initiation frame exchange (for example, after receiving an ACK for the P2P initiation frame), P2P transmission between the STAs may be performed.

For example, the trigger frame may be transmitted at the beginning of the TXOP acquired by the AP MLD, or may be transmitted after the normal traffic exchange is completed during the TXOP.

When the trigger frame is transmitted at the start point of the TXOP acquired by the AP MLD, the TXOP may be allocated to P2P traffic, or the remaining TXOP may be used for general traffic exchange after the P2P traffic exchange is completed.

C. Thereafter, P2P transmission may be performed between the P2P non-AP MLD STA pairs.

D. When the P2P transmission terminates earlier than the predetermined period, the source P2P device (ie, the P2P initiator) may transmit, to the AP MLD, a release message indicating that the P2P transmission is terminated.

Figure 11:
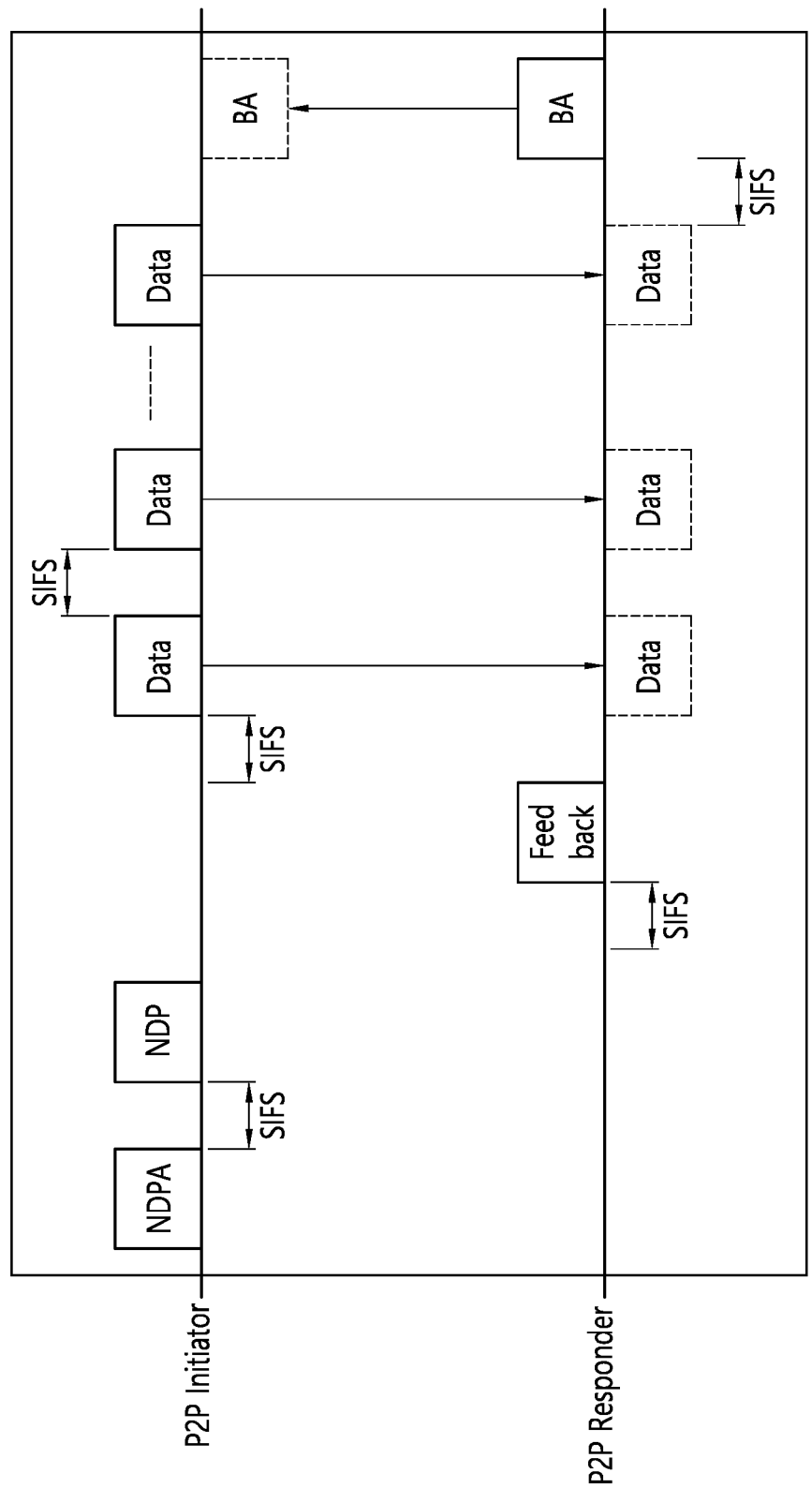
FIG. 11 is a diagram illustrating an embodiment of a P2P transmission method initiated by an AP.

FIG. 11 is a diagram illustrating an embodiment of a P2P transmission method initiated by an AP.

Referring to FIG. 11, the P2P initiator may transmit NDPA and NDP frames to the P2P responder. The P2P responder may receive the NDP frame, and may estimate the channel state based on it. The PDP responder may transmit a feedback frame including the estimated channel state information to the P2P initiator. The P2P initiator may transmit data to the P2P responder based on the channel state information.

2. P2P Transmission Method Initiated by Non-AP STA (STA-Initiated)

Method for Sharing P2P Intent Between AP MLD and Non-AP MLD:

Negotiation Phase:

A. A non-AP MLD P2P STA having data for P2P transmission may transmit a request signal to the AP MLD.

The request signal includes its own source address, target P2P non-AP MLD information (a non-AP MLD Mac address, etc.), buffer status (for example, buffer status report (BSR)), location information, channel status availability information, and the like. The location information may be used by the AP MLD to schedule one or more P2P transmission pairs. The channel availability information may indicate whether a channel between the P2P initiating a non-AP MLD STA and the target P2P Non-AP MLD STA is available.

B. The AP MLD may transmit an ACK for the request signal. The ACK may include information related to parameters recommended by the AP MLD.

Figure 12:
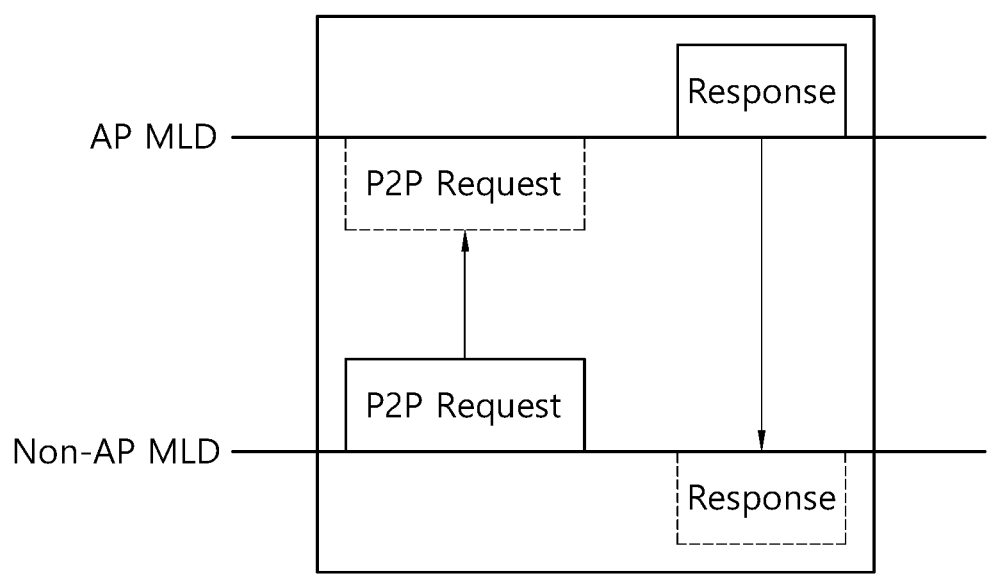
FIG. 12 is a diagram illustrating an embodiment of a P2P transmission method initiated by an STA.

FIG. 12 is a diagram illustrating an embodiment of a P2P transmission method initiated by an STA.

FIG. 12, the non-AP MLD may transmit a P2P request signal to the AP MLD, and the AP MLD may transmit a response upon receiving the P2P request. The contents included in the P2P Request and Response signals may be the same as the contents included in the above-described request signal and ACK. Although only one non-AP MLD is illustrated in FIG. 12, a plurality of P2P requests may be transmitted during the P2P request period. In this case, the ACK may be transmitted as MU-ACK.

P2P Transmission Steps:

Case 2-1: When the P2P Transmission Initiator Knows the Channel Between the P2P Transmission Initiator and the P2P Responder A. The AP MLD may transmit a trigger frame including information for P2P transmission. For example, the trigger frame may be transmitted using the SU/MU PPDU. P2P transmission may be performed in UL/DL orthogonal frequency division multiple access (OFDMA). The trigger frame may be a modification of the existing frame (for example, information or a field for P2P transmission is included in the existing trigger frame) or may be newly defined. For example, a trigger frame type for P2P transmission may be newly defined.

P2P transmission may entirely use the TXOP obtained by the AP, or may share the TXOP with general transmission (ie, transmission between the STA and the AP). When the AP transmits TXOP-related information to an STA (for example, a source STA that is a P2P initiator), information related to whether to use TXOP only for P2P transmission or whether to use TXOP for both P2P transmission and general transmission may be transmitted. For example, information related to TXOP may transmit an indicator related to whether the TXOP is for P2P transmission only or whether the TXOP is for both general transmission and P2P transmission. For example, the indicator may include information that if it has a value of 0, TXOP is for P2P transmission only, and if it has a value of 1, TXOP is for both P2P transmission and general transmission as 1-bit information.

When TXOP is used for both P2P transmission and normal transmission, P2P transmission may be performed within the TXOP before normal transmission, between normal transmissions, or after the normal transmission ends. The P2P transmission in the TXOP may be performed after the P2P start frame indicating the start of P2P transmission by the P2P transmitting STA (ie, the P2P initiator STA). The P2P start frame may be a newly defined frame, or an existing frame (for example, NDPA, MU-RTS, etc.) may be used as the P2P start frame. The P2P initiation frame may be transmitted by the AP (or STA), and after the P2P initiation frame exchange (for example, after receiving an ACK for the P2P initiation frame), P2P transmission between the STAs may be performed.

For example, the trigger frame may be transmitted at the beginning of the TXOP acquired by the AP MLD, or may be transmitted after the normal traffic exchange is completed during the TXOP.

When the trigger frame is transmitted at the start point of the TXOP acquired by the AP MLD, the TXOP may be allocated to P2P traffic, or the remaining TXOP may be used for general traffic exchange after the P2P traffic exchange is completed.

B. The trigger frame may include information for P2P transmission. For example, the trigger frame may include resource unit (RU) allocation information, P2P source/destination address, resource allocation information for ACK transmission, modulation and coding scheme (MCS), a number of space-time-stream (NSTS), and the like. The P2P device may transmit an ACK. For ACK, a general ACK frame or a BA frame may be used.

Case 2-2: when the P2P Transmission Initiator does not Know the Channel Between the P2P Transmission Initiator and the P2P Responder A. The AP MLD may transmit a trigger frame including information for P2P transmission. For example, the trigger frame may be transmitted using the SU/MU PPDU. P2P transmission may be performed in UL/DL orthogonal frequency division multiple access (OFDMA). The trigger frame may be a modification of the existing frame (for example, information or a field for P2P transmission is included in the existing trigger frame) or may be newly defined. For example, a trigger frame type for P2P transmission may be newly defined.

P2P transmission may entirely use the TXOP obtained by the AP, or may share the TXOP with general transmission (ie, transmission between the STA and the AP). When the AP transmits TXOP-related information to an STA (for example, a source STA that is a P2P initiator), information related to whether to use TXOP only for P2P transmission or whether to use TXOP for both P2P transmission and general transmission may be transmitted. For example, information related to TXOP may transmit an indicator related to whether the TXOP is for P2P transmission only or whether the TXOP is for both general transmission and P2P transmission. For example, the indicator may include information that if it has a value of 0, TXOP is for P2P transmission only, and if it has a value of 1, TXOP is for both P2P transmission and general transmission as 1-bit information.

When TXOP is used for both P2P transmission and normal transmission, P2P transmission may be performed within the TXOP before normal transmission, between normal transmissions, or after the normal transmission ends. The P2P transmission in the TXOP may be performed after the P2P start frame indicating the start of P2P transmission by the P2P transmitting STA (ie, the P2P initiator STA). The P2P start frame may be a newly defined frame, or an existing frame (for example, NDPA, MU-RTS, etc.) may be used as the P2P start frame. The P2P initiation frame may be transmitted by the AP (or STA), and after the P2P initiation frame exchange (for example, after receiving an ACK for the P2P initiation frame), P2P transmission between the STAs may be performed.

For example, the trigger frame may be transmitted at the beginning of the TXOP acquired by the AP MLD, or may be transmitted after the normal traffic exchange is completed during the TXOP.

When the trigger frame is transmitted at the start point of the TXOP acquired by the AP MLD, the TXOP may be allocated to P2P traffic, or the remaining TXOP may be used for general traffic exchange after the P2P traffic exchange is completed.

B. When the P2P interval starts, the source P2P (ie, P2P initiator) device may transmit a null data packet announcement (NDPA) and a null data packet (NDP) to the target P2P device (ie, P2P responder).

C. The target P2P device may measure the channel through the NDP and transmit the measured channel state information to the source P2P device.

D. The source P2P device may determine MCS, NSTS, and the like, based on the channel state information, and may transmit a data frame based on the determined information.

E. Target P2P device may transmit ACK (for example, normal ACK or BA) in an implicit/explicit method.

F. If the P2P transmission terminates earlier than the predetermined period, the source P2P device (ie, the P2P initiator) may transmit, to the AP MLD a release message indicating that the P2P transmission is terminated.

Figure 13:
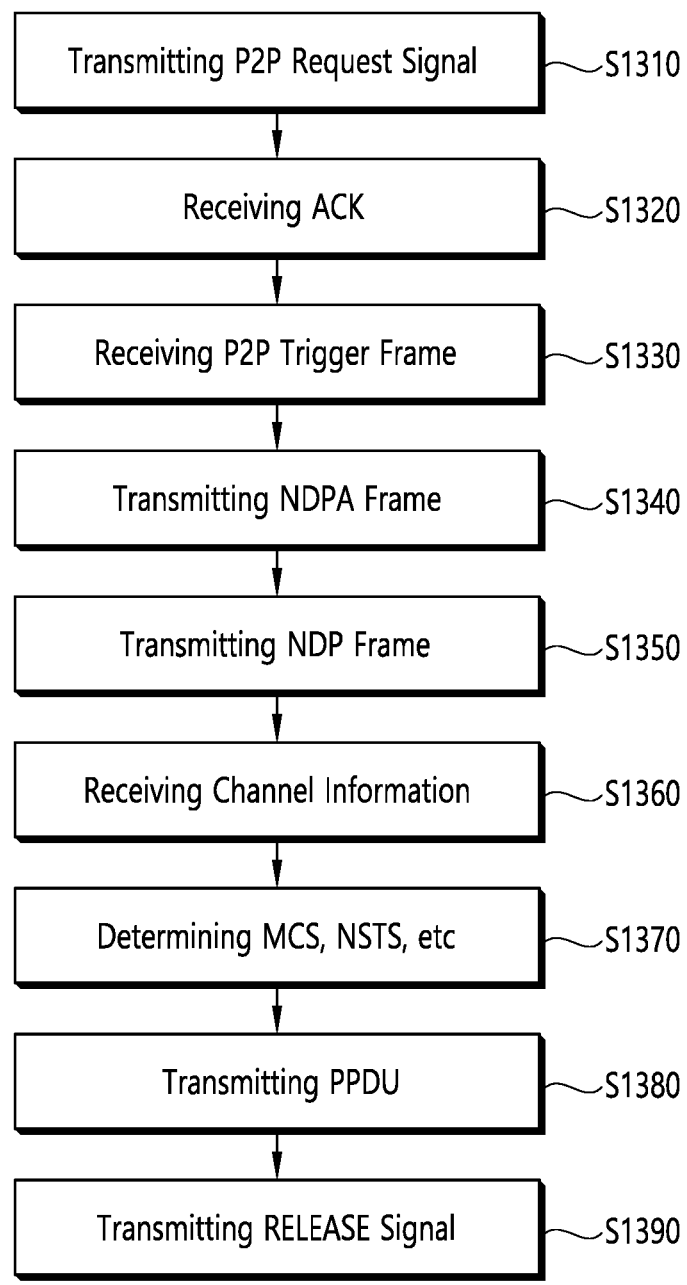
FIG. 13 is a diagram illustrating an embodiment of a method of operating a transmitting STA.

FIG. 13 is a diagram illustrating an embodiment of a method of operating a transmitting STA.

Referring to FIG. 13, the transmitting STA may transmit a P2P request signal (S1310). For example, the transmitting STA may transmit a peer-to-peer (P2P) request signal to an access point (AP). For example, the P2P request signal may include at least one of the receiving STA address, the buffer status of the transmitting STA, location information of the transmitting STA, and channel state information of the transmitting STA.

The transmitting STA may receive the ACK (S1320). For example, the transmitting STA may receive an ACK for the P2P request signal from the AP.

The transmitting STA may receive the P2P trigger frame (S1330). For example, the transmitting STA may receive a P2P trigger frame from the AP. For example, the P2P trigger frame may include allocation information of a first resource for the transmitting STA to transmit the PPDU to the receiving STA, and allocation information of a second resource for an ACK to be transmitted from the transmitting STA to the receiving STA. For example, the first resource and the second resource may be secondary channels. For example, the P2P trigger frame may include schedule information for P2P transmission between the transmitting STA and the receiving STA.

The transmitting STA may transmit an NDPA frame (S1340). For example, the transmitting STA may transmit an NDPA frame to the receiving STA.

The transmitting STA may transmit an NDP frame (S1350). For example, the transmitting STA may transmit a null data packet (NDP) frame to the receiving STA.

The transmitting STA may receive channel information (S1360). For example, the transmitting STA may receive, from the receiving STA, channel information between the transmitting STA and the receiving STA.

The transmitting STA may determine an MCS, an NSTS, and the like (S1370). For example, the transmitting STA may determine a modulation and coding scheme (MCS) and a number of space-time-stream (NSTS) based on the channel information.

The transmitting STA may transmit a PPDU (S1380). For example, the transmitting STA may transmit a physical protocol data unit (PPDU) to the receiving STA based on the modulation and coding scheme (MCS) and the number of space-time-stream (NSTS).

The transmitting STA may transmit a RELEASE signal (S1390). For example, the transmitting STA may transmit to the AP a release signal indicating that P2P transmission with the receiving STA has ended.

Figure 14:
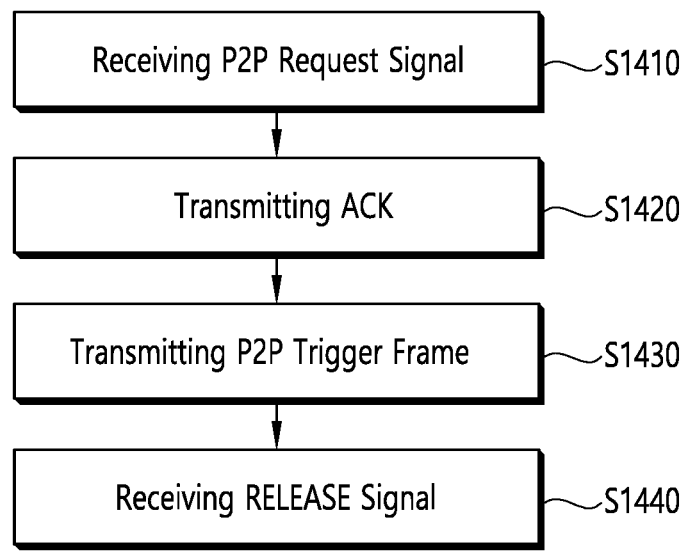
FIG. 14 is a diagram illustrating an embodiment of a method of operating an AP.

FIG. 14 is a diagram illustrating an embodiment of a method of operating an AP.

Referring to FIG. 14, the AP may receive a P2P request signal (S1410). For example, the AP may receive a peer-to-peer (P2P) request signal from a transmitting STA (station).

The AP may transmit an ACK (S1420). For example, the AP may transmit an ACK for the P2P request signal to the transmitting STA.

The AP may transmit a P2P trigger frame (S1430). For example, the AP may transmit a P2P trigger frame to the transmitting STA.

The AP may receive a RELEASE signal (S1440). For example, the AP may receive a release signal from the transmitting STA indicating that P2P transmission with the receiving STA has ended.

Some of the detailed steps shown in the example of FIGS. 13 and 14 may be omitted. In addition to the steps shown in FIGS. 13 and 14, other steps may be added, and the order of the steps may vary. Some of the above steps may have their own technical meaning.

The technical features of the present specification described above may be applied to various devices and methods. For example, the above-described technical features of the present specification may be performed/supported through the apparatus of FIGS. 1 and/or 6. For example, the above-described technical features of the present specification may be applied only to a part of FIGS. 1 and/or 6. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 6. For example, a device of the present disclosure comprises, a memory; and a processor operably coupled to the memory, wherein the processor is configured to: transmit, to an access point (AP), a peer-to-peer (P2P) request signal; receive, from the AP, a P2P trigger frame; transmit, to a receiving STA, a null data packet announcement (NDPA) and a null data packet (NDP) frame; receive, from the receiving STA channel information between the transmitting STA and the receiving STA; determine a modulation and coding scheme (MCS) and a number of space-time-stream (NSTS) based on the channel information; and transmit, to the receiving STA, a physical protocol data unit (PPDU) based on the MCS and the NSTS.

The technical features of the present specification may be implemented based on a computer readable medium (CRM). For example, at least one computer readable medium, proposed by the present specification, storing instructions which, based on being executed by at least one processor of an access point (AP) multi-link device (MLD) in a wireless local area network system, perform operations, the operations comprise: transmitting, to an access point (AP), a peer-to-peer (P2P) request signal; receiving, from the AP, a P2P trigger frame; transmitting, to a receiving STA, a null data packet announcement (NDPA) and a null data packet (NDP) frame; receiving, from the receiving STA, channel information between the transmitting STA and the receiving STA; determining a modulation and coding scheme (MCS) and a number of space-time-stream (NSTS) based on the channel information; and transmitting, to the receiving STA, a physical protocol data unit (PPDU) based on the MCS and the NSTS.

The instructions stored in the CRM of the present specification may be executed by at least one processor. At least one processor related to CRM in the present specification may be the processors 111 and 121 or the processing chips 114 and 124 of FIG. 1, or the processor 610 of FIG. 6. Meanwhile, the CRM of the present specification may be the memories 112 and 122 of FIG. 1, the memory 620 of FIG. 6, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a first non-access point (non-AP) station in a wireless local area network (WLAN) system, the method comprising:
    transmitting, to an AP, a request signal comprising first information related to whether a transmission opportunity (TXOP) obtained by the AP is shared for a direct link between non-AP stations;
    receiving, from the AP, a trigger frame, wherein the trigger frame includes bit information related to the TXOP obtained by the AP,
    wherein the bit information has a first value when the TXOP obtained by the AP is shared for a first uplink communication from the first non-AP station to the AP and a second direct communication to a second non-AP station,
    wherein the bit information has a second value when the TXOP obtained by the AP is shared only for the second direct communication;
    transmitting, to the second non-AP station, a null data packet announcement (NDPA) and a null data packet (NDP) frame;
    receiving, from the second non-AP station, channel information between the first non-AP station and the second non-AP station;
    determining a modulation and coding scheme (MCS) and a number of space-time-stream (NSTS) based on the channel information; and
    transmitting, to the second non-AP station, a physical protocol data unit (PPDU) based on the MCS and the NSTS.

2. The method of claim 1,
    wherein the request signal includes at least one of an address of the first non-AP station, an address of the second non-AP station, a buffer state of the first non-AP station, location information of the first non-AP station, or channel state information of the first non-AP station.

3. A first non-access point (non-AP) station in a wireless local area network system, comprising:
    a transceiver for transmitting and receiving a radio signal; and
    a processor coupled to the transceiver, wherein the processor is configured to,
    transmit, to an AP, a request signal comprising first information related to whether a transmission opportunity (TXOP) obtained by the AP is shared for a direct link between non-AP stations;
    receive, from the AP, a trigger frame, wherein the trigger frame includes bit information related to the TXOP obtained by the AP,
    wherein the bit information has a first value when the TXOP obtained by the AP is shared for a first uplink communication from the first non-AP station to the AP and a second direct communication to a second non-AP station,
    wherein the bit information has a second value when the TXOP obtained by the AP is shared only for the second direct communication;
    transmit, to the second non-AP station, a null data packet announcement (NDPA) and a null data packet (NDP) frame;

receive, from the second non-AP station channel information between the first non-AP station and the second non-AP station;

determine a modulation and coding scheme (MCS) and a number of space-time-stream (NSTS) based on the channel information; and transmit, to the second non-AP station, a physical protocol data unit (PPDU) based on the MCS and the NSTS.

4. The transmitting STA of claim 3, wherein the request signal includes at least one of an address of the first non-AP station, an address of the second non-AP station, a buffer state of the first non-AP station, location information of the first non-AP station, or channel state information of the first non-AP station.

* * * * *